J. PLATT.
Grist Mill.
No. 3,283. Patented Sept. 28, 1843.
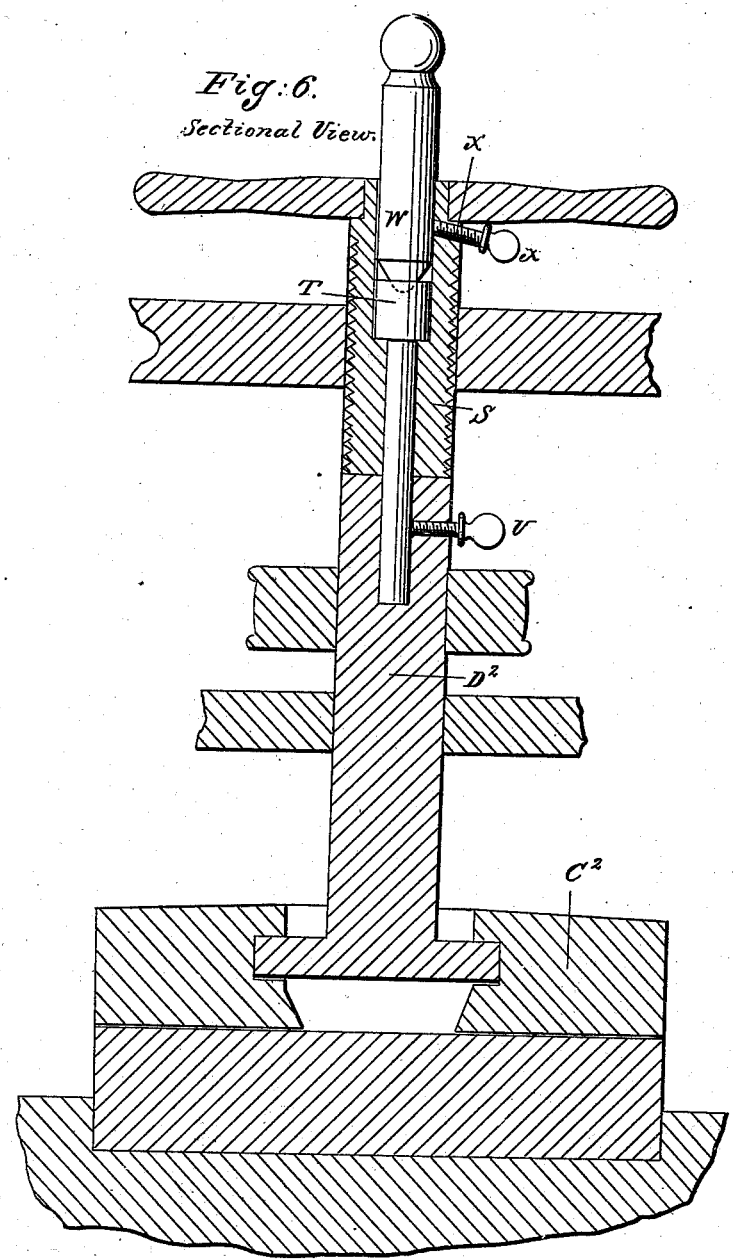

UNITED STATES PATENT OFFICE.

JOSIAH PLATT, OF WESTON, CONNECTICUT.

GRIST-MILL.

Specification of Letters Patent No. 3,283, dated September 28, 1843.

*To all whom it may concern:*

Be it known that I, JOSIAH PLATT, of Weston, in the county of Fairfield and State of Connecticut, have invented a new and useful improvement on my grist-mill for grinding grain for which I obtained Letters Patent on the 9th day of October, 1841, which improvement is described as follows, reference being had to the annexed drawings of the same making part of this specification, marked Figure 6, which is a vertical section of the spindle to which the runner is suspended and the screw to which the spindle is attached and by which it is raised and lowered.

The invention and improvement which I have made in the grist mill consists in attaching or suspending the runner $C^2$ directly to the screw S used for raising and lowering it from or toward the face of the bed stone and which is effected by boring the screw from the upper end to near the middle of the length of the screw the diameter of the head of a strong round connecting bolt T which is to be inserted therein and boring out the center of the screw the remaining portion of its length to the diameter of the shank or stem of said connecting bolt which is about half the diameter of said head of said bolt. The upper end of the mill spindle $D^2$ is likewise bored to the same diameter as the bolt to admit the same. The bolt is then inserted from the upper end of the screw at the large bore, the head resting upon the shoulder formed by the small bore and the stem passed through the small bore of the screw into the corresponding bore of the spindle, where it is secured by a horizontal screw U inserted into a female screw in the spindle having the point of said horizontal screw screwed into the connecting bolt which thus holds it firmly and thereby connects the spindle to the screw in a simple and secure manner, so that by merely turning the screw S which is effected by handles on the same, or in any more convenient way, the runner is raised or lowered to the height required; and this mode I consider preferable to raising a sliding frame to which the runner is attached, by the screw as described in my former patent.

Instead of using weights for increasing the pressure of the runner and for preventing its rising by increasing its velocity which would produce friction, I make use of a steel pin W which I insert into the aforesaid cavity in the head of the screw until its lower end, which is made convex, enters a corresponding depression or cup made in the upper end of the aforesaid head of the connecting bolt in which position said pin is firmly held by a horizontal screw X passed through the screw. The side of this pin is scarfed or filed off in order to leave a small space for the introduction of oil which descends to the connecting bolt and lubricates the same. Before inserting the connecting bolt a suitable washer, or washers, should be slipped on the bolt or placed upon the shoulder of the cavity for the head of the bolt to turn on. The several parts are made of suitable materials and of the requisite size and strength for the purpose intended. The great velocity that the runner acquires would cause it to rise from the bed stone and carry with it the spindle, bringing the latter against the lower end of the suspending screw, were it not for the aforesaid arrangement of steel pin W that keeps down the connecting bolt and spindle attached thereto—and thus the friction above alluded to is prevented. The female screw or nut into which the screw is inserted will be in one of the cross timbers of the frame of the mill or in any convenient place. And in order to render the motion of the spindle steady and regular it will be made to pass through a corresponding aperture in another cross bar of the frame.

All that I claim as my invention is—

The manner of suspending the runner to the screw by means of the connecting bolt shoulders and screw and of raising and lowering the runner as herein set forth whether the connection be effected precisely in the manner described or in any other mode substantially the same.

JOSIAH PLATT.

Witnesses:
 ARAD WOODSWORTH,
 J. E. DOW.